United States Patent
Antonie

[15] 3,704,783
[45] Dec. 5, 1972

[54] APPARATUS FOR TREATING SEWAGE

[72] Inventor: Ronald L. Antonie, Milwaukee, Wis.

[73] Assignee: Autotrol Corporation, Glendale, Wis.

[22] Filed: June 17, 1970

[21] Appl. No.: 46,968

[52] U.S. Cl. .....................210/151, 210/17, 210/256
[51] Int. Cl. ..............................................C02c 1/10
[58] Field of Search..........210/15, 17, 150, 151, 256; 261/92

[56] References Cited

UNITED STATES PATENTS

| | | | |
|---|---|---|---|
| 3,575,849 | 4/1971 | Torpey | 210/17 X |
| 2,071,591 | 2/1937 | Tholin | 210/17 |
| 1,343,797 | 6/1920 | Stott et al. | 210/14 |
| 2,934,325 | 4/1960 | Haglund | 261/92 |
| 3,485,372 | 12/1969 | Nordgard | 210/150 |

Primary Examiner—Michael Rogers
Attorney—Thomas W. Ehrmann and Allan W. Leiser

[57] ABSTRACT

A waste water treatment apparatus and method in which completely submerged movable biological contactors, such as rotating disks, are used to provide biological treatment of waste water in a treatment tank.

The completely submerged biological contactors provide a surface for attachment and growth of microorganisms and provide contact between the attached biomass and the impurities in the waste water. Suitable aerating means, such as partially submerged rotating disks, provide aeration of the waste water to maintain aerobic biological activity in the attached biomass on the completely submerged biological contactors.

7 Claims, 7 Drawing Figures

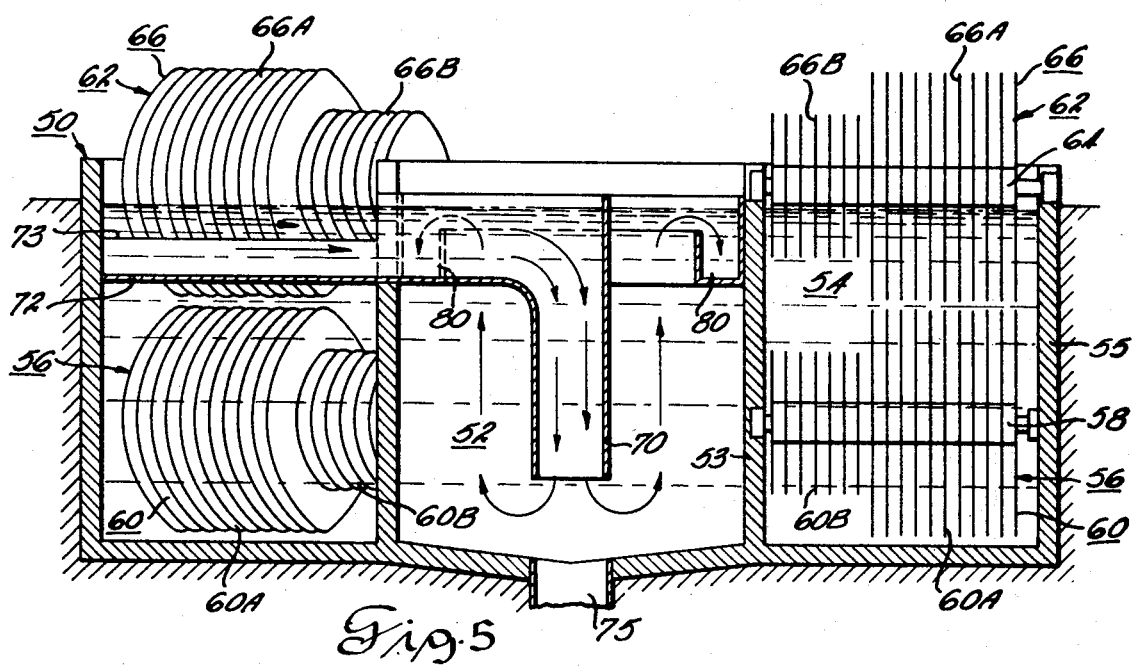
Fig.5
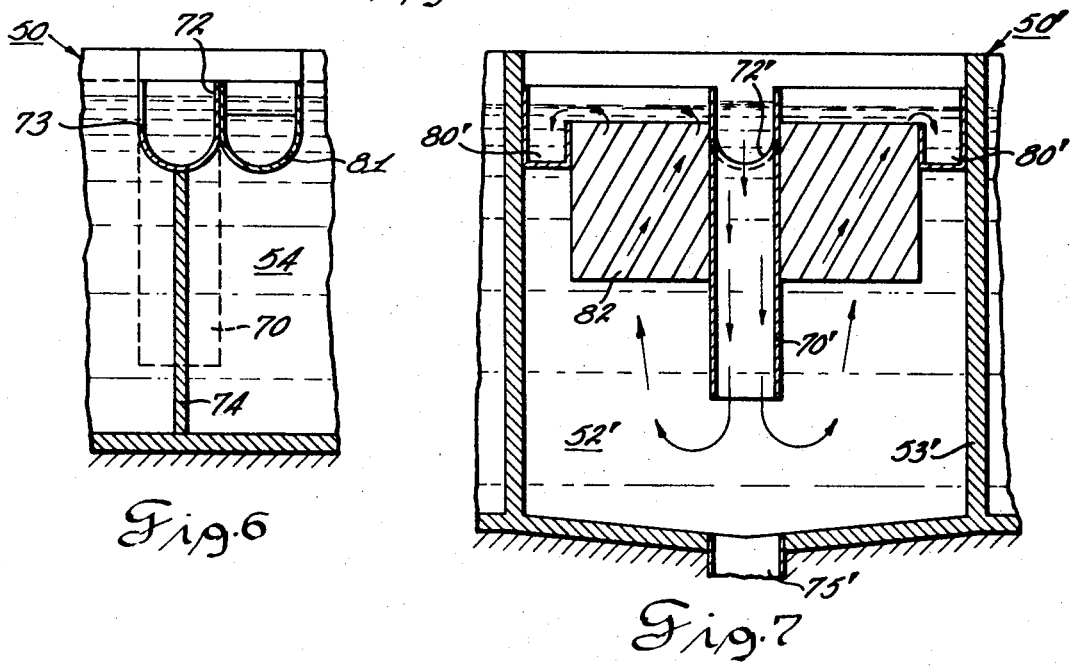
Fig.6
Fig.7
Inventor
Ronald L. Antonie
By Robert C. Sullivan
Attorney

APPARATUS FOR TREATING SEWAGE

BACKGROUND OF THE INVENTION

1. Field of the Invention

This invention relates to a sewage or waste water treatment apparatus and method, and more particularly to a sewage treatment apparatus and method utilizing completely submerged movable biological contactor means.

2. Description of the Prior Art

It is known in the art of sewage or waste water treatment to utilize what may be referred to as a "rotating biological contactor" including a rotating member covered with a biomass of aerobic bacterial slime and rotated so as to bring the biological slime on the rotating member alternately into contact with the sewage being treated and with an oxygen containing atmosphere. One example of a rotating biological contactor is shown by U.S. Pat. No. 2,433,884 issued to John G. Bevan on Jan. 6, 1948, which shows a drum or cylinder type of rotatable biological contactor. Another form of rotating biological contactor is shown by British Pat. No. 935,162 to Hans Hartmann, published on Aug. 28, 1963, which shows the use of a plurality of disk members extending parallel to the direction of sewage flow and mounted on a shaft which extends transverse of the direction of sewage flow. The disk members are coated with a bacterial film and are rotated into alternate contact with atmospheric oxygen and with the sewage to be treated. The bacterial slime on the rotating disks consists principally of aerobic bacteria which have the ability to adsorb, absorb, coagulate and oxidize the undesirable organic constituents of the sewage and to change such constituents into unobjectionable forms of matter. The presence of the biological film or slime on the rotating disks also greatly increases the transfer of oxygen to the sewage through which the disks rotate, thereby promoting the multiplication or synthesis of the aerobic bacteria already present in the mixed liquor and in the bacterial film on the disks, as well as increasing the ability of the aerobic bacteria to act upon the sewage and reduce it to unobjectionable forms.

Rotatable biological contactors employing rotatable disk members coated with aerobic bacterial film are also shown by U.S. Pat. Nos. 3,335,081 issued to Ahmed Sami El-Naggar on Aug. 8, 1967 and 3,484,836 issued to Fredrick M. Welch on Dec. 16, 1969.

The rotating biological contactors of the type shown in the aforementioned patents thus perform the following three functions:

1. They provide a surface for attachment and growth of microorganisms.
2. They provide contact between the attached biomass and the impurities in the wastewater.
3. They provide aeration of the waste water to maintain aerobic biological activity in the attached biomass.

In the current drive for water pollution control it is desirable to utilize existing waste treatment facilities to as large an extent as possible but to expand the treatment capacity of such facilities and to upgrade the treatment provided by such facilities. The present invention provides an apparatus for and method of waste water treatment utilizing submerged disks in conjunction with an aerating means, which, while not restricted thereto, is particularly suitable for use in expanding the treatment capacity of and upgrading the treatment provided by existing sewage or waste water treatment facilities.

SUMMARY OF THE INVENTION

Accordingly, it is an object of the present invention to provide an apparatus for and method of waste water treatment which provides an optimum utilization of treatment space.

It is another object of the invention to provide an apparatus and method which permits upgrading treatment or expansion of existing waste water treatment plants without requiring additional land area and tankage.

It is another object of the invention to provide an apparatus for and method of upgrading and expanding existing waste water treatment facilities which can be used in existing primary treatment tanks, in existing secondary biological treatment tanks, and also in existing secondary clarification tanks.

In achievement of these objectives, there is provided in accordance with this invention a waste water treatment apparatus and method in which completely submerged movable biological contactors, such as rotating disks, are used to provide biological treatment of waste water in a treatment tank.

The completely submerged biological contactors provide a surface for attachment and growth of microorganisms and provide contact between the attached biomass and the impurities in the waste water. Suitable aerating means, such as partially submerged rotating disks, provide aeration of the waste water to maintain aerobic biological activity in the attached biomass on the completely submerged biological contactors.

Further objects and advantages of the invention will become apparent from the following description taken in conjunction with the accompanying drawings in which:

BRIEF DESCRIPTION OF THE DRAWINGS

FIG. 5 is a view in section along line V—V of FIG. 4;

FIG. 6 is a view in section along line VI—VI of FIG. 4; and

FIG. 7 is a view of a modified embodiment of the invention in which inclined surface separators are used in the clarifier section.

Figure 1:
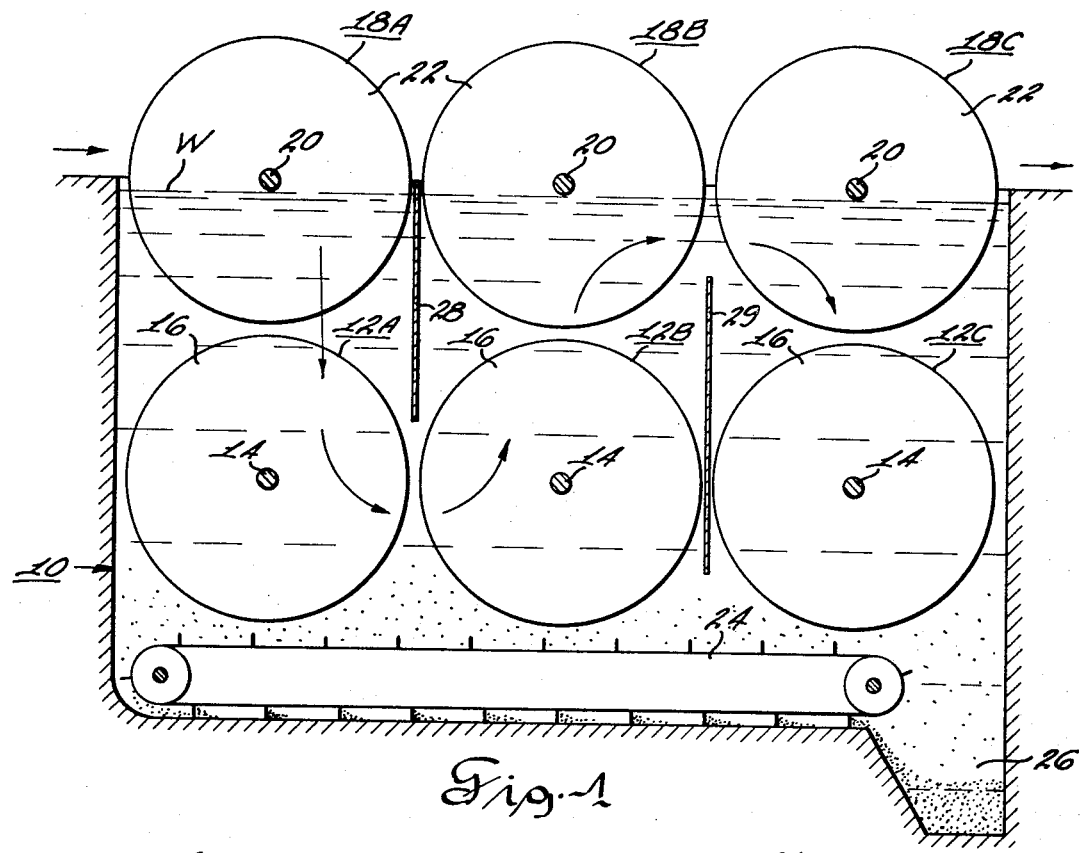
FIG. 1 is a view in vertical section, partially diagrammatic, of an existing sewage treatment tank modified to incorporate the completely submerged rotating disks and partially submerged disks in accordance with an embodiment of the invention.

Referring now to the drawings, and more particularly to FIG. 1, there is shown a tank generally indicated at 10 which is filled with waste water to a height W. The tank 10 is rectangular in horizontal cross section and typically might be 10 to 20 feet deep, 20 to 50 feet wide, and 50 to 300 feet long. The waste water or sewage enters at the left-hand end of tank 10 and exits at the right-hand end of tank 10, with respect to the view in FIG. 1.

In accordance with the invention, a plurality of completely submerged rotating disk assemblies respectively indicated at 12A, 12B, and 12C are provided. Each assembly 12A, 12B, 12C includes a shaft 14 to which are fixed a plurality of relatively closely spaced disk members 16. The shafts 14 are driven by a suitable drive means (not shown) at a speed of rotation which may be, for example, 0.5 rpm to 40 rpm. Assuming the tank 10 is 15 feet in depth, the disks 16 may be 10 feet in diameter, for example.

The disks 16 although completely submerged provide surfaces for attachment and growth of aerobic microorganisms and further provide contact between the attached biomass on the respective disks 16 and the organic impurities in the waste water.

In order to provide aeration of the waste water to provide the dissolved oxygen required by the biomass carried by the respective completely submerged disks, an aerating means is provided in the form of a plurality of partially submerged rotating disk assemblies respectively indicated at 18A, 18B, 18C each including a shaft 20 on which are mounted a plurality of disks 22. A suitable drive means (not shown), is provided for rotating disks 22. Disks 22 may, but not necessarily, be of the same diameter as disks 16, for example.

The shafts 14 and 20 extend transverse of the direction of sewage flow and transverse of the longitudinal axis of tank 10 whereby disks 16 and 22 lie in planes parallel to the direction of sewage flow.

The partially submerged disks 22 develop an aerobic biomass on the surfaces thereof which provide a biological treatment of the waste water in tank 10 supplementing the biological action of the completely submerged disks 16. However, in the present combination an important function of the partially submerged disks 22 is to provide aeration for the biomass which clings to the completely submerged disks 16. The partially submerged disks 22 aerate the waste water in tank 10 to provide the dissolved oxygen required by the aerobic biomass of the completely submerged disks 16.

Instead of using partially submerged disks 22 to perform the aeration function hereinbefore described, other alternative types of aerating devices may be used. For example, a diffused aerating device may be used such as perforated pipe members through which air is forced, as shown by U.S. Pat. No. 3,335,081 of El-Naggar. Other frequently used aeration devices utilize perforated plates or other bodies of porous material such as fused silicon carbide, through which air is forced under substantial pressure into the liquid in the tank. Alternatively any one of a number of types of mechanical surface aerators may be used, such as, for example, the mechanical aerators shown by U.S. Pat. No. 3,426,899 issued to E. J. Smith on Feb. 11, 1969.

If desired, and particularly if tank 10 is a primary sedimentation tank having significant amounts of grit and/or denser settleable solids therein, a sludge collection means including a movable conveyor 24 may be positioned in the lower part of tank 10 beneath the lower periphery of the completely submerged disks 16. The sludge collection conveyor 24 discharges into a sump 26. Instead of using the sludge collection apparatus shown in the embodiment of FIG. 1, and particularly if tank 10 is a secondary treatment tank which follows an existing primary treatment tank, the lower end of the tank 10 may be provided with contoured bottom surfaces beneath the lower periphery of the respective completely submerged disk assemblies to inhibit the deposit of sludge, as shown in the modified embodiment of FIG. 2.

In order to prevent the short circuiting of the waste water flow through the tank and to ensure that the waste water which is aerated by the partially submerged disks 22 is directed into contact with the completely submerged disks 16, baffles 28 and 29 are provided.

Baffles 28 and 29 are mounted in an alternating or staggered arrangement such that the waste water must flow in a serpentine path alternately downwardly beneath the baffles 28 and then upwardly above the baffles 29, thereby insuring good contact of the aerated waste water with the completely submerged disks 16 by providing a favorable residence time distribution of the waste water in the tank.

The embodiment shown in FIG. 2 includes a tank 10' in which are positioned a plurality of completely submerged rotating disk assemblies generally indicated at 30A, 30B and 30C, each having a shaft 32 driven by a suitable drive means, on which shaft is mounted a plurality of disks 34, all as previously described in connection with the embodiment of FIG. 1. The waste water or sewage enters tank 10' at the left-hand end of the tank and exits at the right-hand end of the tank, with respect to the view shown in FIG. 2. Mounted above the completely submerged disk assemblies are a plurality of partially submerged disk assemblies respectively indicated at 36A, 36B and 36C. Disk assemblies 36A, 36B and 36C each respectively comprise a shaft 38 driven by a suitable drive means, and to each shaft 38 is affixed a plurality of partially submerged disks 40 all as previously described in connection with the embodiment of FIG. 1. To minimize interstitial areas, between disks (void space bounded by the peripheries of contiguous disk assemblies such as 12A, 12B, 18A and 18B of FIG. 1) and thereby maximize effective disk area per unit volume, the shafts 38 of the partially submerged disks 40 are offset from the shafts 32 of the completely submerged disks 34 as seen in FIG. 2, shafts 38 lying in vertical planes which are axially spaced from the vertical planes in which the shafts 32 lie, or, expressed another way, the shafts 32 and 38 are alternately arranged lengthwise of the tank.

Figure 2:
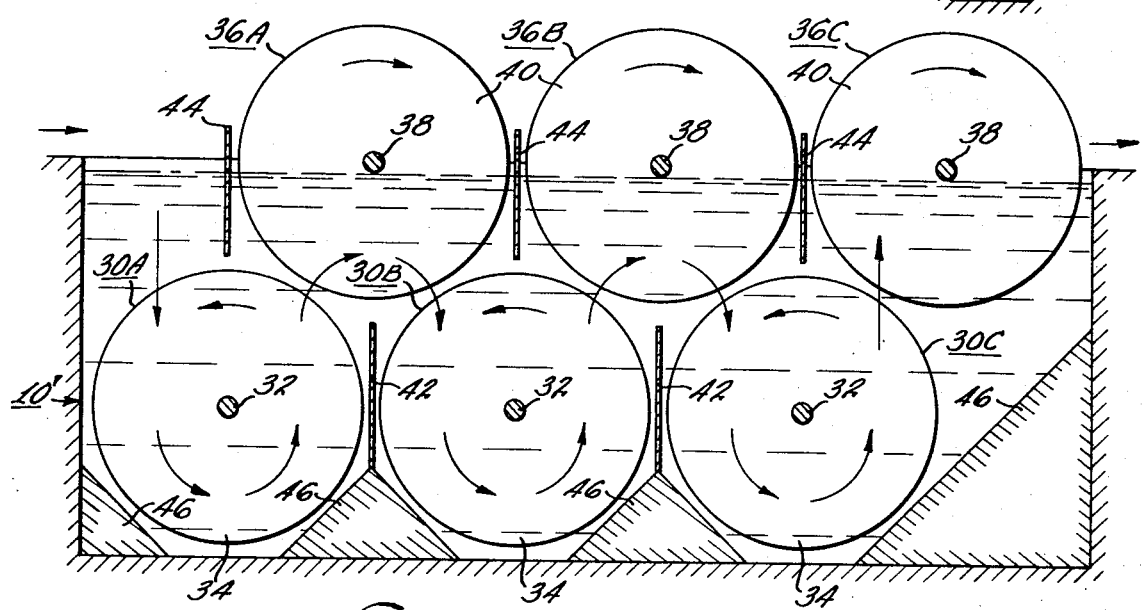
FIG. 2 is a view in vertical cross section of a modified embodiment in which the shafts of the completely submerged disks lie in vertical planes which are offset from the vertical planes in which the shafts of the partially submerged disks lie.

The shaft arrangement of FIG. 2 just described would be used principally in long rectangular tanks, while the shaft arrangement of FIG. 1, in which shafts 20 are mounted directly above shafts 14, would be used principally in short rectangular tanks.

To prevent short circuiting of the waste water flow through the tank, baffles 42 are provided between contiguous completely submerged disk assemblies 30A, 30B and 30C, while baffles 44 are provided at the locations shown between contiguous partially submerged disk assemblies 36A, 36B and 36C.

As in the embodiment of FIG. 1, baffles 42 and 44 cause the waste water to flow in a serpentine path alternately downwardly beneath the baffles 44 and then upwardly above the baffles 42, thereby insuring a favorable waste water residence time distribution and good contact of the aerated waste water with the completely submerged disks 34.

In the embodiment of FIG. 2, contoured bottoms 46 are provided beneath the completely submerged disk assemblies 30A, 30B and 30C, the contoured bottoms inhibiting the deposit of sludge in the lower end of the tank.

If the submerged disk assembly is installed in an existing tank having a flat bottom, the contoured portions 46 may be inserts of a suitable material. However, instead of using contoured bottoms 46, a sludge collection means and sump such as shown in the embodiment of FIG. 1 could be used instead. As explained in connection with the embodiment of FIG. 1, contoured bottoms may be used where tank 10' is a secondary treatment tank which follows a primary treatment tank, while a sludge collection means and sump may be used where tank 10' is a primary sedimentation tank having significant amounts of grit and/or denser settleable solids therein.

In the embodiment of FIG. 2, any suitable aerating means such as those discussed in connection with the embodiment of FIG. 1, may be used instead of the partially submerged disk assemblies 36A, 36B, and 36C as a means of aerating the waste water in tank 10'.

Figure 3:
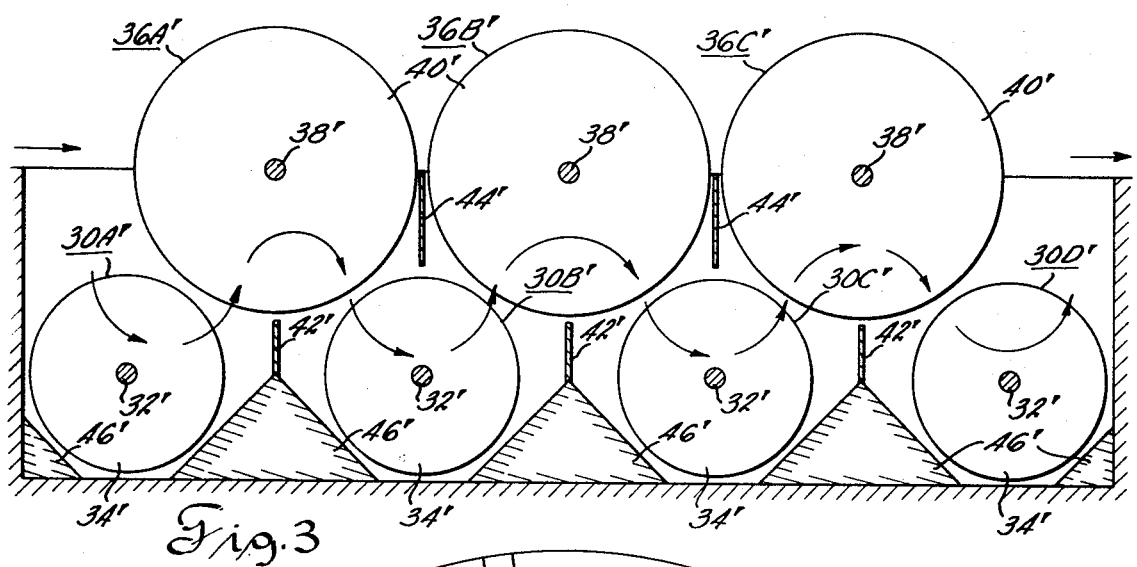
FIG. 3 is a view in vertical cross section of another embodiment of the invention, utilizing submerged disks which are of a different size than the aerating disks.

The embodiment shown in FIG. 3 is similar to the embodiment of FIG. 2, differing substantially only in the use of aerating disks 40' which are of greater diameter than the submerged disks 34'. Primed reference numerals are used in the embodiment of FIG. 3, corresponding to the reference numerals of the embodiment of FIG. 2.

Figure 4:
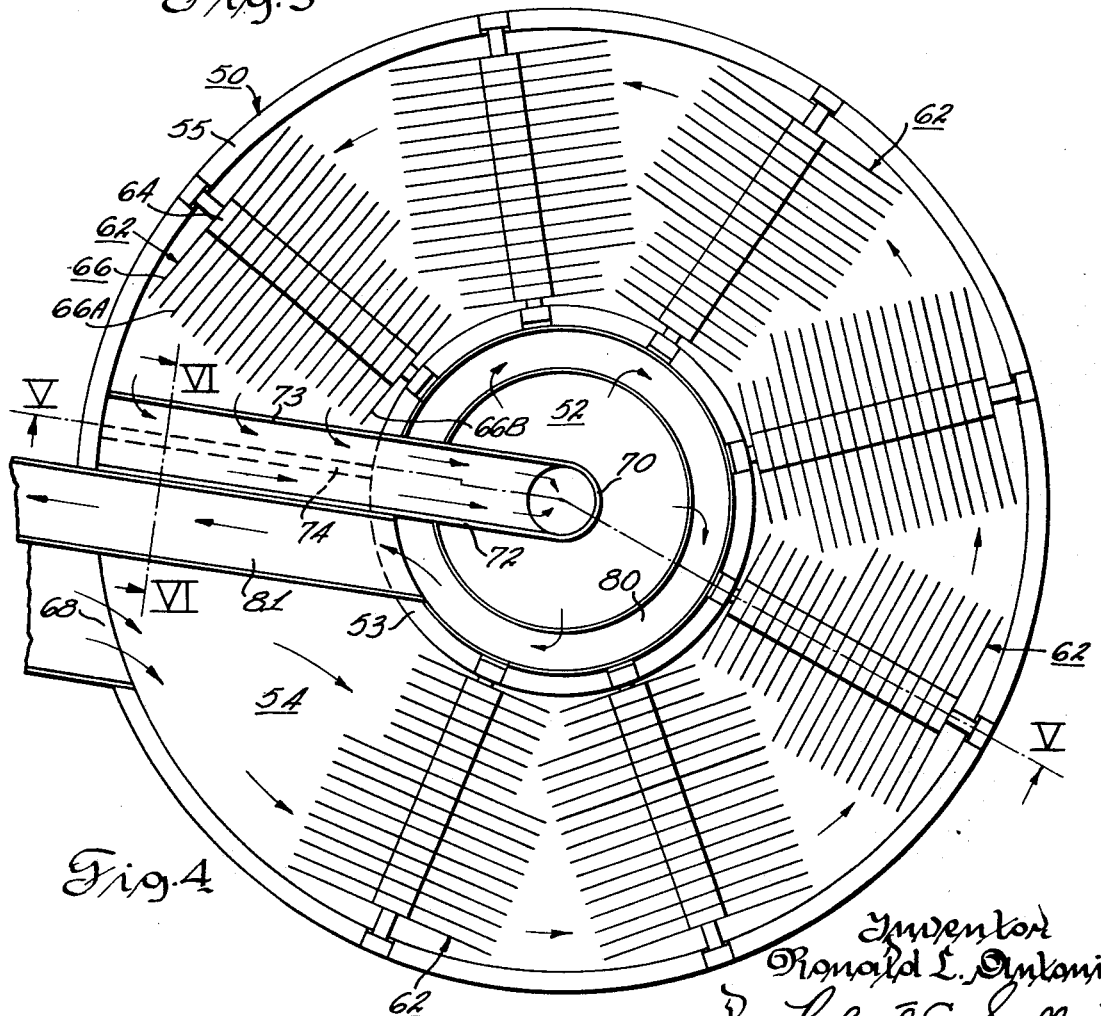
FIG. 4 is a top plan view of an existing circular clarifier tank having disks mounted on shafts which extend radially of the clarifier tank.

Referring now to FIGS. 4, 5 and 6, there is shown an existing clarifier tank 50 of circular cross section including a central cylindrical tank section 52, bounded by wall 53, which tank section 52 is reserved for secondary clarification, and an annular shaped outer tank section 54 lying radially outward of tank section 52 and bounded by radially outer wall 55. A plurality of completely submerged disk assemblies are positioned in radially outer tank section 54 as will now be described. A plurality of completely submerged disk assemblies generally indicated at 56 are positioned in radially extending relation relative to the central axis of tank 50, the completely submerged disk assemblies 56 being positioned around most of the peripheral space of the annular shaped tank section 54. Each of the completely submerged assemblies 56 includes a radially extending shaft 58 which is suitably supported for rotation by bearings in the walls 53 and 55. Shafts 58 are driven by suitable drive means. On each of the shafts 58 are fixedly mounted a plurality of disks 60. Two groups or subassemblies of disks 60 are provided on each shaft 58, namely, the group indicated at 60A which are of greater diameter and the group indicated at 60B which are of lesser diameter. By having disks 60B of lesser diameter at the radially inner portion of shaft 58, shafts 58 may be positioned closer together without interference between the disks at the radially inner portion of the respective shafts 58.

Positioned at a level above the completely submerged rotary disk assemblies 56 are the partially submerged disk assemblies generally indicated at 62 which are mounted on radially extending shafts 64 and have fixed thereto disks generally indicated at 66 including larger diameter disks 66A at the radially outer portion of the respective shaft and smaller diameter disks 66B at the radially inner end of the respective shaft. The use of the smaller diameter disks 66B prevents interference between the radially inner portions of contiguous rotary disk assemblies 62 in the same manner as described in connection with the completely submerged disk assemblies 56. In a typical tank of 10 feet in depth, the larger diameter disks 60A and 66A might be of 6 feet in diameter, while the smaller diameter disks 60B and 66B might be of 3 feet in diameter, for example. Shafts 64 are driven by suitable drive means.

In the circular tank embodiment of FIGS. 4, 5 and 6 the shafts 58 and 64 of the assemblies 56 and 62 may be arranged either in a common vertical plane, as in the embodiment of FIG. 1, or in alternate vertical planes, as in the embodiment of FIG. 2. Also, in the circular tank embodiment, either a sludge collection mechanism and cooperating sump may be provided, as shown in FIG. 1, or, alternatively, contoured bottoms may be provided as shown at 46 in FIG. 2.

Also, in the circular tank embodiment of FIGS. 4, 5 and 6, any suitable aerating means, such as those discussed in connection with the embodiment of FIG. 1, may be used instead of the partially submerged disk assemblies 62 as a means of aerating the wastewater in tank 50. Furthermore, baffles such as those shown in the embodiments of FIGS. 1 and 2 may be used to prevent short circuiting of the waste water through the tank and to insure that the water which is aerated by the aerating means, such as the partially submerged disks, is brought into contact with the completely submerged disks, as explained in connection with the embodiments of FIGS. 1 and 2.

If the apparatus of FIGS. 1–3 is used in existing primary treatment tanks, the effluent can pass directly to secondary treatment. If the apparatus of FIGS. 1–3 is used in existing secondary biological treatment tanks, the effluent can pass directly to existing secondary clarification tanks.

If the system of FIGS. 1–3 is used in secondary clarification tanks, the effluent will require additional equipment to provide secondary clarification, such as an additional settling tank or section.

If the required degree of upgrading of treatment allows, a portion of the existing secondary clarification tank or tanks can be reserved for secondary clarification of the effluent from the submerged disks, as shown in the case of the secondary clarification section 52 of circular clarifier tank 50 in FIGS. 4–6, inclusive. This is possible because the biological solids generated by a system utilizing rotatable biological contactors settle much faster than those from conventional biological waste water treatment thereby permitting use of a smaller settling tank for a given flow of waste water.

The cooperative relation of the clarifier section 52 with the biological treatment section 54 of tank 50 is best seen by reference to FIGS. 4–7, inclusive. The clarifier section 52 is provided with a vertical hollow pipe member 70 lying on the central vertical axis of section 52 and having the open upper end thereof positioned to receive the material discharged from inclined conduit or trough 72 which receives the mixed liquor or treated waste water which has passed through the biological treatment section 54 of tank 50. Conduit or trough 72 is positioned continuous the vertical partition 74 which extends for the height of annular biological treatment section 54 and which separates the inlet 68 of biological treatment section 54 from the discharge trough 72.

The waste water which is to be biologically treated enters tank section 54 through inlet 68. The waste water flows in a counterclockwise direction around section 54 as indicated by the arrows in FIG. 4, being contacted by the rotating disk assemblies 56 and 62 as previously described. After the waste water has circulated through annular tank section 54 in a counterclockwise direction as far as the partition or barrier 74, it passes over the weirlike edge 73 of trough 72 and into trough 72, and flows through trough 72 into the upper end of pipe 70.

The material discharged by the trough 72 into the upper end of the hollow pipe 70 passes downwardly through pipe 70 and through the lower end thereof which is spaced above the bottom floor of tank 50. As the liquid passes downwardly through center pipe 70 and discharges from the lower end of pipe 70, some of the solids in the mixed liquor drop to the floor of the chamber 52, where they pass through discharge outlet 75. Most of the solid particles which are not separated at this time settle downwardly through the chamber 52 as the liquid passes upwardly therethrough toward discharge trough 80. The liquid passing upwardly through section 52 discharges into the upper end of a hollow discharge trough 80. A suitable discharge trough 81 discharges the effluent from annular discharge trough 80 to a suitable discharge point.

There is shown in FIG. 7, a modified arrangement for the clarifier section 52' in accordance with which settling action is promoted by use of inclined sludge collecting surfaces which are positioned in and suitably supported in the upper portion of section 52' surrounding pipe 70'. The inclined sludge collecting surfaces may be either tube settlers 82 shown in FIG. 7; or, alternatively, may be tilted plate separators (not shown). The structure shown in FIG. 7 is similar to that shown in FIGS. 4, 5, and 6 except for the addition of the tube settlers or tilted plate separators to be described, and primed reference numerals respectively corresponding to the reference numerals of the embodiment of FIGS. 4, 5 and 6 are used to identify the various parts of the embodiment of FIG. 7. The biologically treated waste water after emerging from the lower end of pipe 70', passes upwardly through clarifier section 52' and upwardly through the tube settlers 82 or through the tilted plate separator (whichever is used). The tube settlers 82 may be of the type manufactured by Neptune MicroFloc Incorporated, Water and Wastewater Treatment Division of Neptune Meter Company, P. O. Box 612, 1965 Airport Road, Corvallis, Oregon, 97330 and described in Bulletin No. KL-4512 of Neptune MicroFloc Incorporated, Copyright 1968, titled "Neptune MicroFloc Offers Advanced Techniques For Wastewater Treatment and Reclamation." The tube settlers 82 are hollow tubular members arranged in closely spaced relation to each other and each inclined at an angle such as an angle in the range 45°–60° relative to the horizontal plane. The tube settlers 82 are preferably small diameter tubes, for example, 1 inch in diameter and 4 feet long, through which water passes for example at a rate of 10 gallons per minute/ft.$^2$ of cross section area.

With the tube settlers 82 being inclined at a steep angle such as an angle in the range 45°–60° relative to the horizontal plane, continuous gravity drainage of the settleable material from the tubes can be achieved. The incoming solids settle to the tube bottom and then exit from the tubes by sliding downward along the tube bottom where they are discharged to the lower end of the clarifier section 52', from whence they pass through passage 75' to a suitable point of discharge. A flow pattern is established in which the solids settling to the bottom of tube settlers 82 are trapped in a downward flowing stream of concentrated solids. This countercurrent flow of solids aids in agglomerating particles into larger heavier particles which settle against the velocity of the upwardly flowing liquid. The continuous sludge removal achieved in these steeply inclined tubes eliminates the need for back flushing of the tubes for sludge removal. The tubes may be embodied, for example, in tube modules constructed of plastic. The tube modules may be formed by placing extruded plastic channels at the desired angle, such as an angle in the range 45°–60° relative to the horizontal plane, between plastic sheets. By alternating the direction of inclination of each row the module becomes a self-supporting beam which needs support only at its ends.

Instead of using tube settlers 82 as just described, a tilted plate separator assembly may be provided comprising a plurality of corrugated plates suitably supported so as to lie in spaced parallel planes, the space between contiguous parallel plates being, for example, several inches. The plates are collectively inclined or tilted at an angle such as, for example, an angle in the range 45°–60° relative to the horizontal plane. The material containing the settleable solids flows upwardly through the tilted plate assembly toward the discharge end, flowing in laminar paths in the spaces between the contiguous parallel plates. Settleable solids precipitate into the "valleys" of the inclined corrugated plates in a manner generally similar to the precipitating effect described in connection with the tube settlers, whereby the settleable solids slide downwardly along the inclined surfaces of the valleys of the tilted plates, from whence they are discharged to the lower end of clarifier section 52'. The fluid material from which the settleable solids have been removed by precipitation as just described is discharged from the upper end of the open ended tilted plate separator from whence it passes into the discharge trough 80'. Tilted plate separators are known per se. The tilted plate separator may be of the type manufactured by Pielkenrood-Vinitex N.V., Assendelft, Holland, and shown and described in the periodical "Chemical Engineering," Jan. 12, 1970 issue, page 60.

It will be understood that the word "tank" as used in the specification and claims is intended to cover any suitable means for holding or confining the material being treated including a tank, reservoir, basin, pond, or the like.

From the foregoing detailed description of the present invention, it has been shown how the objects of the invention have been obtained in a preferred manner. However, modifications and equivalents of the disclosed concepts such as readily occur to those skilled in the art are intended to be included within the scope of this invention.

I claim:

1. A waste water treatment apparatus comprising a treatment tank adapted to receive waste water to be treated, said tank being of circular horizontal cross section and including two concentric annular sections, movable biological contactor means mounted in said tank in completely submerged position and movable into contact with said waste water for biological treatment of said waste water, said biological contactor means being positioned in one of said annular sections, the other of said annular sections being adapted to serve as a clarifying means, aeration means adapted to act upon the waste water in said one section to provide dissolved oxygen to said waste water, and means for conducting waste water which has been biologically treated in said one section to said other section for clarification.

2. A waste water treatment apparatus as defined in claim 1 in which said aeration means comprises a second shaft mounted to extend radially in said one section, and partially submerged disk means mounted on said second shaft for rotation therewith.

3. A waste water treatment apparatus as defined in claim 1 in which said biological contactor means comprises a first shaft mounted to extend radially in said one section, and disk means mounted on said first shaft for rotation therewith.

4. A waste water treatment apparatus as defined in claim 1 including at least two radially extending first shafts mounted contiguous each other in radially diverging relation to each other, each shaft having mounted thereon for rotation therewith a group of larger diameter disks lying on a radially outer portion of the respective shaft and a group of smaller diameter disks lying on a radially inner portion of the respective shaft.

5. A waste water treatment apparatus as defined in claim 1 including inclined surface settler means positioned in said other section in the path of waste water flow through said other section.

6. A waste water treatment apparatus comprising a treatment tank adapted to receive waste water to be treated, biological contactor means mounted for rotation in said tank in a completely submerged position and movable into contact with said waste water for biological treatment of said waste water, said biological contactor means comprising a series of submerged rotating biological contactor assemblies having relatively closely spaced vertical surfaces and disposed along the length of said tank; aeration means adapted to act upon the waste water in said tank to provide dissolved oxygen to said waste water, said aeration means operating at the surface of the waste water in said tank; and baffle means adapted to direct waste water which has been aerated by said aeration means into contact with said submerged assemblies, said baffle means directing waste water in a serpentine path between said aeration means and said submerged assemblies, and said assemblies providing surfaces for attachment and growth of a biomass of microorganisms with the dissolved oxygen provided by said aeration means maintaining aerobic biological activity of said biomass.

7. A waste water treatment apparatus comprising a treatment tank adapted to receive waste water to be treated, biological contactor means mounted for rotation in said tank in a completely submerged position and movable into contact with said waste water for biological treatment of said waste water, rotatable biological contactor means partially submerged in said waste water at a level above said completely submerged rotatably biological contactor means, and adapted to act upon the waste water in said tank to provide dissolved oxygen to said waste water, said submerged and partially submerged biological contactor means each being comprised of a series of contactor assemblies having relatively closely spaced vertical surfaces and being disposed along the length of the tank, and baffle means for directing waste water which has been contacted by said partially submerged biological contactor means into contact with said completely submerged biological contactor means, said baffle means directing waste water in a serpentine path between said partially submerged biological contactor means and said fully submerged biological contactor means, and said fully submerged rotating biological contactor means providing surfaces for attachment and growth of a biomass of microorganisms with the dissolved oxygen provided by said partially submerged biological contactor means maintaining aerobic biological activity of said biomass.

* * * * *